United States Patent
Kamiyama

[11] Patent Number: 5,909,419
[45] Date of Patent: Jun. 1, 1999

[54] DISK DISCRIMINATION APPARATUS FOR AN OPTICAL DISK REPRODUCING APPARATUS

[75] Inventor: Hideyo Kamiyama, Tokorozawa, Japan

[73] Assignee: Pioneer Electronic Corporation, Tokyo, Japan

[21] Appl. No.: 08/863,208

[22] Filed: May 27, 1997

[30] Foreign Application Priority Data

May 28, 1996 [JP] Japan .................................. 8-156210

[51] Int. Cl.$^6$ ......................................................... G11B 7/00
[52] U.S. Cl. .......................... 369/58; 369/54; 369/44.28
[58] Field of Search .............................. 369/44.25, 44.26, 369/44.27, 54, 58, 94, 44.28, 44.29

[56] References Cited

U.S. PATENT DOCUMENTS

| | | | |
|---|---|---|---|
| 4,773,052 | 9/1988 | Sugiura et al. | 369/2 |
| 4,890,273 | 12/1989 | Takeuchi et al. | 369/45 |
| 5,130,967 | 7/1992 | Tanaka et al. | 369/56 |
| 5,381,392 | 1/1995 | Hira | 369/54 |
| 5,721,718 | 2/1998 | Hwang | 369/58 |

FOREIGN PATENT DOCUMENTS

| | | |
|---|---|---|
| 0 767 455 | 4/1997 | European Pat. Off. . |
| 0 790 604 | 8/1997 | European Pat. Off. . |
| 8-83465 | 3/1996 | Japan . |

*Primary Examiner*—Thang V. Tran
*Attorney, Agent, or Firm*—Sughrue, Mion, Zinn, Macpeak & Seas, PLLC

[57] ABSTRACT

A disk discrimination apparatus for use in an optical disk reproducing apparatus detects a tracking error signal, discriminates between disks, and prevents reproduction of a disk which does not correspond to the reproducing apparatus. In the disk discrimination apparatus, when a second type disk, having a track pitch which is smaller than that of a first type disk, is played by the optical disk reproducing apparatus, a discriminator detects that the disk is not a first type disk based on an output signal of a tracking error signal generating circuit. The discriminator performs a discrimination operation by comparing the signal level of a tracking error signal with a predetermined reference value. In another embodiment, the discriminator includes a counter for counting the number of zero-crossings of the tracking error signal, and performs the disk discrimination using a count value produced by the counter.

3 Claims, 4 Drawing Sheets

DISK DISCRIMINATION APPARATUS FOR AN OPTICAL DISK REPRODUCING APPARATUS

BACKGROUND OF THE INVENTION

1. Field of the Invention

The present invention relates generally to an optical disk reproducing apparatus, and more particularly to an apparatus for discriminating between disks having different recording formats, for use in an optical disk reproducing apparatus.

2. Description of Related Art

Among conventional disk reproducing apparatuses, discrimination of disk types is typically performed between CD (Compact Disc) and LD (Laser Disc). The discrimination between CD and LD is possible by using different diameters of the CD and LD. More specifically, a pickup is first moved to a position outside the area of a CD and inside the area of a LD, the loaded optical disk is then rotated and determination is made as to whether or not the focus servo system locks. If it locks, the loaded disk is determined to be a LD, and if it does not lock, the disk is determined to be a CD.

On the other hand, in recent years there exists a strong demand for the increase of the recording capacity and the broadening of the compatibility among devices. To meet these demands, disks of the same size having different recording formats such as DVD (Digital Versatile Disk, or Digital Video Disk) are being developed.

A DVD has the same diameter as a CD, and its recording capacity is more than 4 gigabytes, which is far greater than the 640 megabyte CD recording capacity. The pit size and track pitch of a DVD are smaller than those of a CD because information is recorded at high density.

When attempting to reproduce a DVD in a player for CD reproduction, the reproduction of a DVD having high recording density is not possible because the diameter of the beam spot of the pickup is too large to read the pits on the DVD.

Furthermore, when locking of the focus servo system is tried when reproducing a DVD, that operation may cause a loss of control of the pickup moving mechanism because the tracking error signal is not properly produced when closing of the tracking servo system is attempted.

OBJECT AND SUMMARY OF THE INVENTION

An object of the present invention is to provide an apparatus for discriminating disks, preventing the reproduction of a disk which does not correspond to the player. The discrimination is made, for example, by using a tracking error signal obtained when the tracking servo loop is open, the apparatus preventing, for example, the reproduction of a DVD in a CD player.

According to the first aspect of the invention, a disk discrimination apparatus, comprises: a pickup for reading recorded information from an optical disk and producing an output signal, the optical disk having either a predetermined first track pitch or a second track pitch smaller than the first track pitch; a tracking error signal generating means for receiving the output signal and generating a tracking error signal indicating a tracking error of the optical disk; and a disk discrimination means for receiving the tracking error signal and performing a disk discrimination operation, to determine from the tracking error signal whether the optical disk has the first or the second track pitch.

According to the second aspect of the present invention, the disk discrimination apparatus according to the first aspect of the invention features that the disk discrimination means performs the disk discrimination operation by comparing a signal level of the tracking error signal with a predetermined threshold value.

According to the third aspect of the present invention, the disk discrimination apparatus according to the first aspect of the invention further comprises a counter which counts a number of zero-crossings of the tracking error signal, wherein the disk discrimination means performs the disk discrimination operation by using a count value generated by the counter.

According to the fourth aspect of the present invention, a disk discrimination apparatus, comprises: a pickup for reading recorded information on a first optical disk having a predetermined track pitch; a radio frequency (RF) signal generating means for generating an RF signal by reading said first optical disk; a low-pass filter (LPF) for extracting a low frequency component of said RF signal to produce a focus sum signal; and a disk discrimination means for performing a disk discrimination operation, wherein, when a second optical disk having a second track pitch smaller than the first track pitch is played by the optical disk reproducing apparatus, the disk discrimination means determines that a disk being played is not said first optical disk, based on the focus sum signal.

The disk discrimination apparatus according to the first aspect of the invention performs the discrimination of disks based on the output signal of the tracking error signal generating means, thereby discriminating between different optical disks, such as CD and DVD, by using the arrangement of a simple structure.

The disk discrimination apparatus according to the second aspect of the invention performs the discrimination of disks by comparing the signal level of a signal passed through the tracking error signal generating means with a predetermined threshold level, thereby discriminating between different optical disks such as CD and DVD, by using the arrangement of a simple structure.

The disk discrimination apparatus according to the third aspect of the invention performs the discrimination of disks by counting the number of zero-crossings of the signal passed through the tracking error signal generating means, thereby discriminating between different optical disks, such as CD and DVD, by using the arrangement of a simple structure.

The disk discrimination apparatus according to the fourth aspect of the invention performs the discrimination of disks based on a focus sum signal; when a second optical disk having a track pitch smaller than that of the first optical disk is played by the optical disk reproducing apparatus, thereby discriminating between different optical disks, such as CD and DVD, by using the arrangement of a simple structure.

DETAILED DESCRIPTION OF THE PREFERRED EMBODIMENTS

The embodiments of the disk discriminating apparatus according to the present invention will be described with reference to the accompanying drawings. In the embodiments of the present invention, the light receiving system and the manner of generating the information reading signal and the tracking error signal are basically the same as those employed in CD players.

Figure 1:
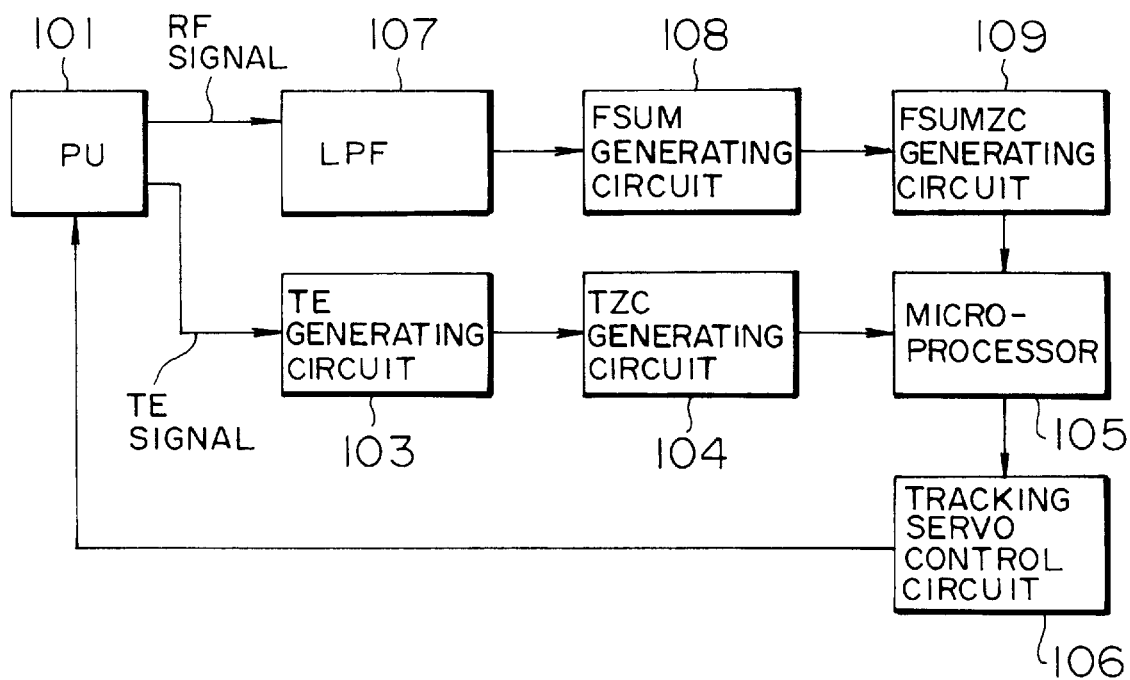
FIG. 1 is a block diagram showing a basic structure of the embodiments of the optical disk reproducing apparatus according to the present invention.

FIG. 1 is a block diagram showing the structure of an embodiment of the disc type discrimination apparatus according to the present invention. In FIG. 1, the pickup 101 emits reading light to a disk (not illustrated), receives a reflection light, and supplies an electrical signal corresponding to the amount of the reflection light to a tracking error (TE) generation circuit 103 and an LPF (Low Pass Filter) 107. The TE generation circuit 103 generates a tracking error signal TE, and supplies it to a tracking zero crossing (TZC) generation circuit 104. The tracking error signal TE is a signal that primarily contains an error component of an irradiation position of the reading beam relative to a recording track center of the disk. In the TZC generation circuit 104, a signal whose polarity inverts at each zero-crossing of the tracking error signal is produced, and the signal is supplied, as a zero-crossing signal, to a microprocessor 105.

The readout information signal (hereinafter, referred to as radio frequency signal RF) supplied by the pickup to the LPF 107, is processed by the LPF 107 so that its high-frequency components are eliminated, and its low-frequency component only is extracted. The low frequency component extracted at the LPF 107 is supplied to a focus sum signal (FSUM) generation circuit 108. In the FSUM generation circuit 108, a focus sum signal is generated, and the signal is then supplied to a focus sum signal zero-crossing (FSUMZC) generating circuit 109. In the FSUMZC circuit 109, a signal whose polarity inverts at each zero-crossing of the focus sum signal is generated, and the signal is supplied, as a focus sum zero-crossing signal, to the microprocessor 105.

The microprocessor 105, counts the number of zero-crossings of each of the supplied zero-crossing signals and performs a count number comparing process in which the counted values are compared with values stored in ROM (not illustrated).

The tracking servo control circuit (IC) 106 receives a tracking control instruction from the microprocessor 105, and drives a tracking drive coil of the pickup 101 with a tracking drive signal produced by a signal processing of the tracking error signal, thereby constituting a tracking servo system. The microprocessor 105 performs a disk discrimination process using the results of the count number comparing process.

Figure 2:
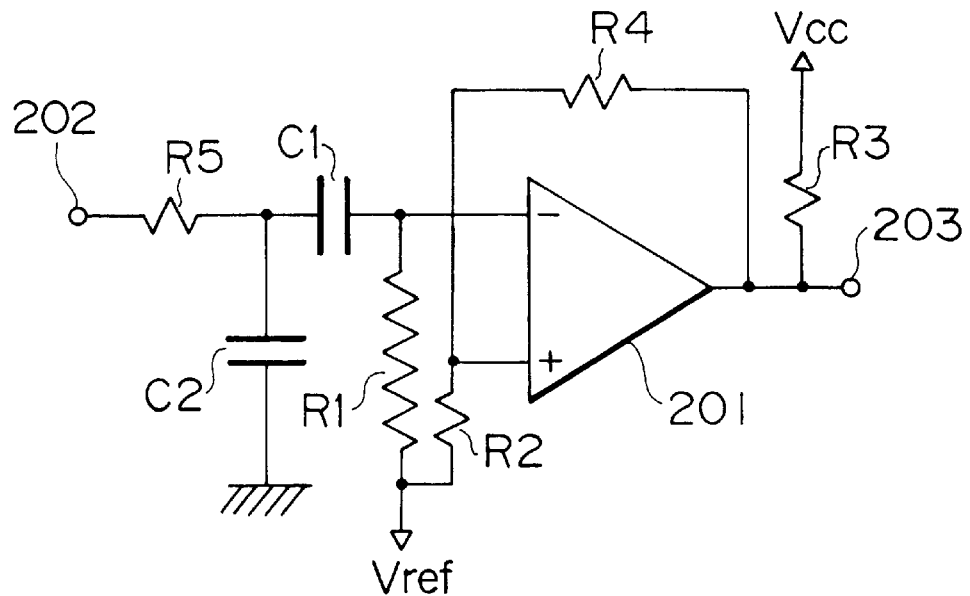
FIG. 2 is a diagram showing a part of the circuit of the first embodiment of the present invention.

One example of the TZC generation circuit 104 uses a hysteresis comparator (a comparator having a hysteresis characteristic) employed as shown in FIG. 2. In FIG. 2, the tracking error signal is supplied to an input terminal 202 of the comparison processing circuit, and an output signal obtained at an output terminal 203 is the result of a comparison at a comparator 201. The tracking error signal received at an input terminal 202 is filtered by a low-pass filter constituted by a resistor R5 and a capacitor C2, so that an AC component of a low-frequency component of the tracking error signal flows through a capacitor C1, and is superposed on a reference voltage Vref. The comparator 201, which has a hysteresis characteristic produced by a feedfoward through a resistor R4, compares the signal produced by the superposition with the reference voltage Vref at the comparator 201, and the resultant output of the comparison is a square wave at the output terminal 203.

An example of a comparator without the hysteresis characteristic and without the provision of the low-pass filter will be explained with reference to FIG. 3. The tracking error signal TE is received at an input terminal 302 of a comparison processing circuit, and a result of the comparison by a comparator 301 is provided at an output terminal 303. An AC component of the tracking error signal received at the input terminal 302 passes through the capacitor C1, and is superposed on the reference voltage Vref. The signal produced by the superposition is compared with the reference voltage Vref at the comparator 301, and the resultant output of the comparison is a square wave at the output terminal 303. In this example, a resister of a large resistance value is used as the resistor R4 so that a hysteresis characteristic is not produced.

Figure 4A:
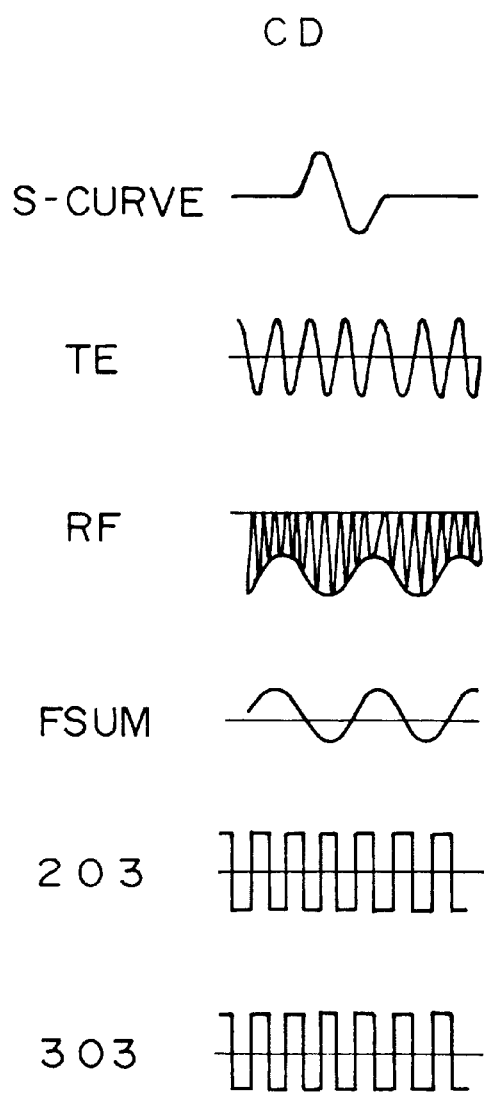
FIGS. 4A and 4B are diagrams showing signals appearing in the embodiment of the present invention.
Figure 4B:
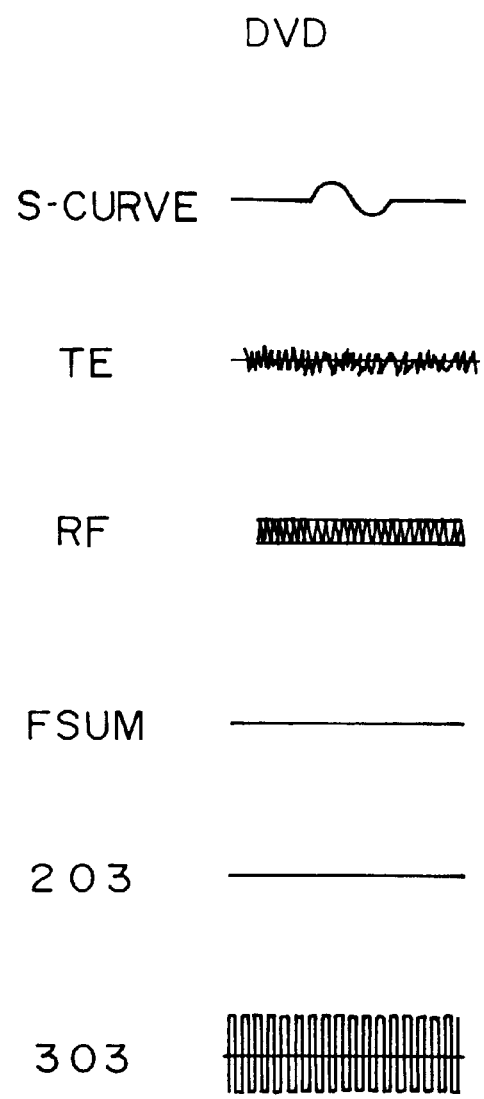

Waveforms of various signals obtained by the player having the above-described configuration, when performing the reproduction with a CD being loaded and the reproduction with a DVD being loaded, are depicted in FIGS. 4A and 4B respectively.

When a CD is loaded in a CD player and a reproduction operation is performed, a tracking error signal TE, an RF signal RF, and a low frequency component FSUM of the focus sum signal are produced as illustrated in FIG. 4A when the tracking servo loop is open, a period after locking of the focus servo loop and before closing of the tracking servo loop. When a disk of high density recording, such as a DVD, is loaded and the reproduction operation is performed, the above-described signals will not be generated accurately, as depicted in FIG. 4B.

In FIGS. 4A and 4B, the waveform illustrated as the S-curve signal is a focus error signal produced by a focus error generation circuit (not illustrated in FIG. 1). The symbol TE represents an output signal produced by the TE generating circuit 103 of FIG. 1, and RF represents an output signal of the LPF 107 of the circuitry shown in FIG. 1. The symbol FSUM represents an output signal of the FSUM generating circuit 108, and the numerals 203 and 303 represent output signals of the TZC generating circuit 104 shown in FIG. 1.

The pickup for CD has a modulation transfer function (MTF) characteristic which allows an optimum detection of spacial frequency components carried by a CD (spacial frequency components of a train of pits recorded on a CD). Therefore, if a high density optical disk such as a DVD is reproduced by the pickup for CD, the signal level of the reproduction signal will be lowered because the spacial frequency components of the high density recorded optical disk fall outside the bandwidth given by the MTF characteristic of the pickup for CD.

Consequently, when attempting to reproduce a high density recording disk such as DVD with a pickup for CD, the signal level of the RF signal is much lower than that obtained when reproducing a CD. This causes the tracking error signal TE and the low frequency component FSUM of the focus summation signal to have a lower signal level than the signals obtained with a CD, where DVD signal waveforms for TE and FSUM are illustrated in FIG. 4B.

The first embodiment of the present invention will now be explained with reference to FIG. 1 and the flowchart of FIG. 5.

Figure 5:
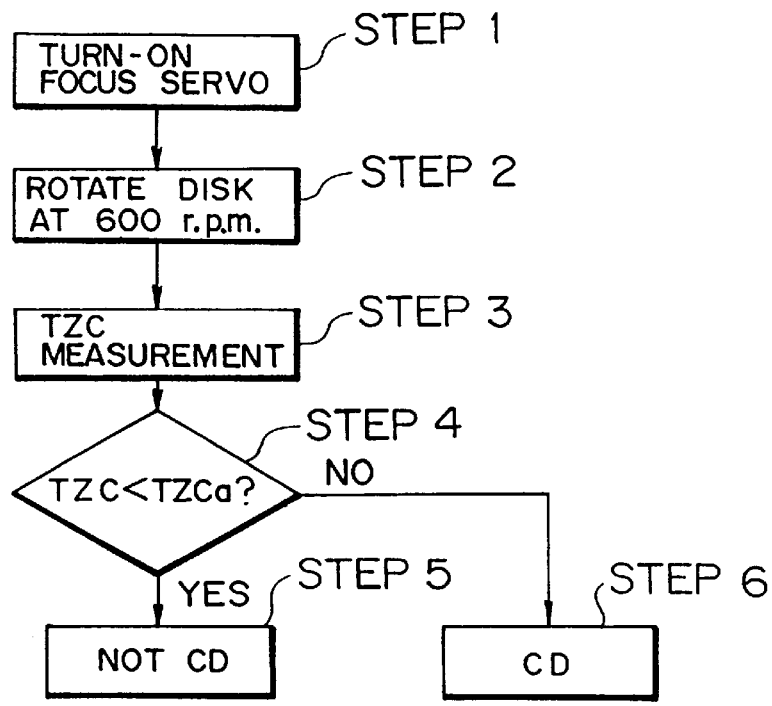
FIG. 5 is a flowchart showing the operation of the first embodiment of the present invention.

The flowchart of FIG. 5 shows the counting and comparison process performed by using the circuitry, shown in FIG. 2, which includes a hysteresis comparator.

As depicted in the flowchart, the focus servo is turned on at step S1, and the disk is rotated at step S2. The rotational speed is, for example, 600 rpm. The number of tracking zero-crossings TZC is then measured at step S3, and a discrimination is made at step S4 as to whether the measured TZC is smaller than a comparison reference TZCa which has been set previously. If TZC is smaller than TZCa, the answer at step S4 is YES, and a decision is made at step S5 that the disk being played is not a CD. If, on the other hand, the answer at step S4 is NO, the process proceeds to step S6, where a decision is made that the disk being played is a CD.

In the case of a high density disk such as a DVD, the high frequency signal component of the input signal 202 of the circuit of FIG. 2 is filtered out by the low-pass filter, so that the tracking error component TE passed through the capacitor C1 is within the hysteresis width, and no output signal is generated at the output terminal 203. Conversely, in the case of a CD, the tracking zero-crossing output is generated at the output terminal 203. Hence, by setting the comparison reference of the count value at a value about 5, a discrimination can be performed in such a way that the disk is a CD if the count value is equal to or greater than the comparison reference, and the disk is a high density disk such as a DVD if the count value is smaller than the comparison reference.

As described above, a discrimination between CD and DVD disks is made by counting the number of zero-crossings of the tracking error signal TE. Since the tracking error signal TE from DVD disk is not produced at the output terminal 203 in this embodiment, the discrimination can also be made by monitoring whether or not an output signal is produced at the output terminal 203.

It is also possible to perform the discrimination between disks by using the difference of levels of the tracking error signal TE.

The second embodiment of the present invention will now be explained with reference to FIG. 1 and the flowchart of FIG. 6.

Figure 3:
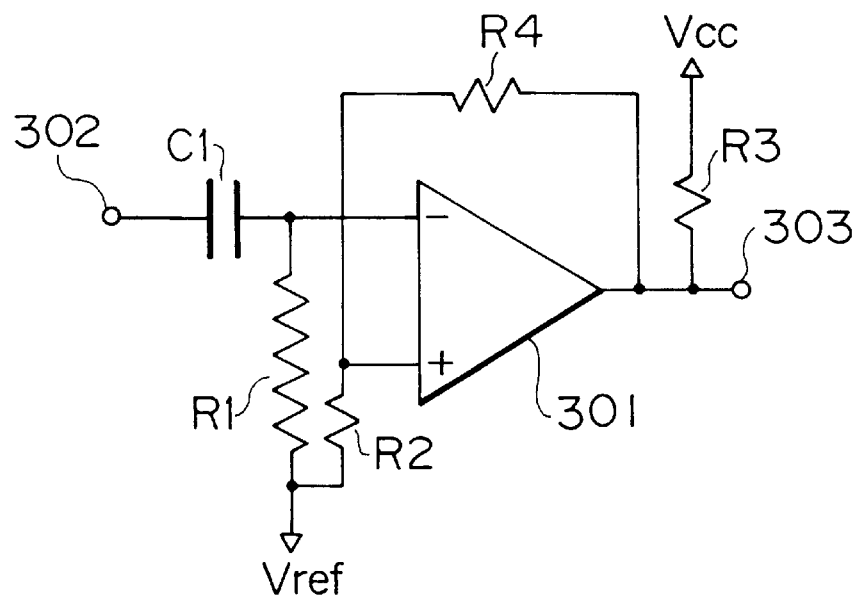
FIG. 3 is a diagram showing a part of the circuit of the second embodiment of the present invention.
Figure 6:
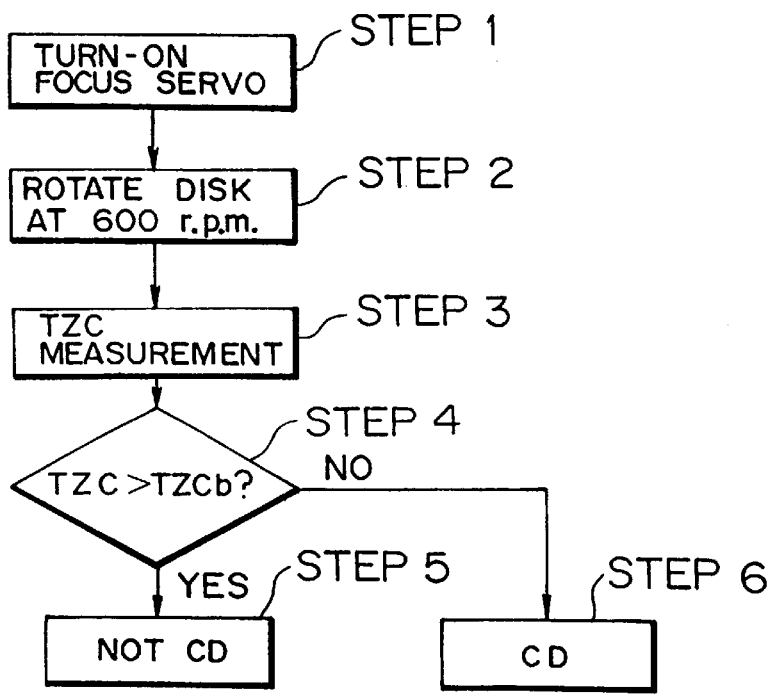
FIG. 6 is a flowchart showing the operation of the second embodiment of the present invention.

The flowchart of FIG. 6 shows the counting and comparison process performed by the circuitry shown in FIG. 3, which uses a comparator without the hysteresis characteristic and without a low-pass filter.

The operating steps shown in FIG. 6 are performed in the a manner similar to the steps explained with reference to FIG. 5. Namely, the focus servo is turned on at step S1, and the disk is rotated at step S2. The rotational speed is, for example, 600 rpm. The number of tracking zero-crossings TZC is then measured at step S3, and a discrimination is made at step S4A as to whether the measured TZC is greater than a comparison reference TZCb which has been set previously. If TZC is greater than TZCa, the answer at step S4A is YES, and a decision is made at step S5 that the disk being played is not a CD. If, on the other hand, the answer at step S4A is NO, the process proceeds to step S6, where a decision is made that the disk being played is a CD.

In the case of the reproduction of a CD, a normal tracking error signal is obtained from the CD, so that the output signal at the output terminal 303 becomes a square-wave signal having 120 cycles per revolution of the disk, for example when the rotational speed of the disk is 600 r.p.m. This is because, if it is assumed that the loaded disk has an eccentricity of 0.1 mm, the light beam crosses about 60 tracks when the track pitch is 1.7 $\mu$m and the number of zero-crossings of such a square-wave signal is about 240.

On the other hand, in the case of the high-density disk such as a DVD, the level of the tracking error signal is very low and near to a degree where the tracking error signal is masked by noise signals. The resultant square-wave signal at the output terminal 303 becomes a random square-wave signal of multi-cycle.

Based on the difference between the tracking error signals from a CD and a high density disk respectively, the discrimination of the disk can be performed by counting the signal at the output terminal 303 using a microprocessor. For instance, the disk discrimination is performed in such a way that the disk being played is determined to be a CD when the count number is equal to or less than 300, and the disk is determined to be a disk other than a CD when the count number is higher than 300.

The third embodiment of the present invention will be described below. The disk discrimination method in this embodiment uses the radio frequency signal RF from the pickup.

With regard to the FSUM signal (the low frequency component FSUM of the focus sum signal) shown in FIG. 4, a normal FSUM signal is retrieved from a CD, whereas the waveform of the FSUM signal is not reproduced from a DVD. Accordingly, by employing a circuit similar to the circuit used in the second embodiment in the FSUMZC generation circuit, the disk discrimination can be performed in a similar manner.

As explained in the foregoing, the disk discrimination is performed by using the difference in the output signal waveforms of the tracking error signal or the RF signal from a CD and DVD respectively, in each of the described embodiments.

Furthermore, although the disk discrimination process itself has been explained by way of the embodiments of the present invention, it is needless to mention that various processes can be performed after the discrimination of the disk has been made. For instance, the operation mode of the disk player may be changed from the playing mode to the stop mode or ejection mode using the disk discrimination result. Moreover, it is possible to indicate that the disk is not normal by display or sound or voice after the disk discrimination.

As will be understood from the above explanation, it is possible according to the present invention to arrange a CD player so that the playing of the disk is stopped and the user is notified that the disk is not a CD when attempting to play a high density disk such as a DVD by the player of the above-described type. If the apparatus is of the type where plurality of kinds of disks can be respectively played by a plurality of kinds of pickups, the pickup can be changed according to a result of the disk discrimination.

It should be understood that the present invention is not limited to the particular embodiments disclosed herein. One skilled in the art may recognize modifications that can be made without departing from the scope and spirit of the invention.

What is claimed is:

1. A disk discrimination apparatus for use in an optical disk reproducing apparatus, comprising:
   a pickup for reading recorded information on a first optical disk having a predetermined track pitch by using a reading light beam;
   a counter which counts a number of zero-crossings of a signal carrying information of a relative position of said reading light beam with respect to a recording track; and a disk discrimination means for performing a disk discrimination operation, wherein, when a second optical disk having a second track pitch smaller than said first track pitch is played by said optical disk reproducing apparatus, said disk discrimination means determines that a disk being played is not said first optical disk, based on a count value of said counter.

2. A disk discrimination apparatus as claimed in claim 1, wherein said counter has a hysteresis range in which no count-up occurs, and wherein said counter counts a number of zero-crossings of a tracking error signal produced from output signals of said pickup, and wherein said disk discrimination means determines that the disk being played is not said first optical disk when said count value of said counter is lower than a predetermined value.

3. A disk discrimination apparatus as claimed in claim 1, wherein said counter counts a number of zero-crossings of a tracking error signal produced from output signals of said pickup, and wherein said disk discrimination means determines that the disk being played is not said first optical disk when said count value of said counter is higher than a predetermined value.

* * * * *